United States Patent
Herrera

(10) Patent No.: US 9,253,951 B2
(45) Date of Patent: Feb. 9, 2016

(54) EMITTER TUBING CLIP

(71) Applicant: Wadeco, Inc., Tualatin, OR (US)

(72) Inventor: Fernando Herrera, Tualatin, OR (US)

(73) Assignee: WADECO, INC., Tualatin, OR (US)

( * ) Notice: Subject to any disclaimer, the term of this patent is extended or adjusted under 35 U.S.C. 154(b) by 528 days.

(21) Appl. No.: 13/682,667

(22) Filed: Nov. 20, 2012

(65) Prior Publication Data

US 2014/0138455 A1     May 22, 2014

(51) Int. Cl.
| | |
|---|---|
| *B05B 15/00* | (2006.01) |
| *A01G 25/02* | (2006.01) |
| *B05B 15/06* | (2006.01) |
| *B05B 15/02* | (2006.01) |
| *B05B 1/00* | (2006.01) |
| *F16L 33/035* | (2006.01) |
| *F16L 23/04* | (2006.01) |
| *F16L 33/025* | (2006.01) |

(Continued)

(52) U.S. Cl.
CPC .............. *A01G 25/023* (2013.01); *A01G 25/02* (2013.01); *B05B 1/00* (2013.01); *B05B 15/02* (2013.01); *B05B 15/065* (2013.01); *B05B 15/069* (2013.01); *F16L 3/233* (2013.01); *F16L 23/04* (2013.01); *F16L 33/025* (2013.01); *F16L 33/035* (2013.01); *F16L 33/2076* (2013.01)

(58) Field of Classification Search
CPC ........ B05B 1/00; B05B 15/02; B05B 15/065; B05B 15/069; A01G 25/02; A01G 25/023; F16L 33/035; F16L 23/04; F16L 33/2076; F16L 33/025; F16L 3/233
USPC ............. 239/1, 104, 145, 461, 505, 542, 547, 239/600; 24/20 S, 20 R, 23 EE, 16 PB; 285/256, 257
See application file for complete search history.

(56) References Cited

U.S. PATENT DOCUMENTS

| | | | | |
|---|---|---|---|---|
| 5,647,563 | A | * | 7/1997 | Gantner et al. ............. 24/23 EE |
| 5,815,892 | A | * | 10/1998 | Geppert ........................ 24/20 R |
| 5,878,963 | A | * | 3/1999 | Bates ............................ 239/542 |

(Continued)

FOREIGN PATENT DOCUMENTS

KR     1020020048059 A     6/2002

OTHER PUBLICATIONS

International Search Report and Written Opinion in related PCT/US2013/069927, mailed Feb. 14, 2014.

(Continued)

*Primary Examiner* — Steven J Ganey
(74) *Attorney, Agent, or Firm* — Schwabe Williamson & Wyatt

(57) ABSTRACT

An embodiment provides a device for assisting fluid distribution that includes a ring having an inner surface disposed over an emitter tube and an engagement portion to secure the ring to the emitter tube. Another embodiment provides a flow-control system that includes an emitter tube having spaced orifices therein, emitters positioned within the emitter tube adjacent the spaced orifices, and spaced clips positioned on the emitter tube, the clips having an inner surface disposed over the emitter tube and an engagement portion to secure the ring to the emitter tube. Another embodiment provides a method for assisting fluid distribution that includes the following steps: selecting an emitter tube; installing emitters within the emitter tube; and mounting, to the emitter tube, rings, each having an inner surface disposed over the emitter tube and an engagement portion to secure each ring to the emitter tube.

11 Claims, 19 Drawing Sheets

(51) Int. Cl.
*F16L 33/207* (2006.01)
*F16L 3/233* (2006.01)

(56) References Cited

U.S. PATENT DOCUMENTS 6,052,873 A 4/2000 Cuno
6,568,043 B1 * 5/2003 Detable et al. ............... 24/20 R 2004/0183299 A1 9/2004 Svensson
2004/0222631 A1 11/2004 Baxi et al.
2009/0188085 A1 7/2009 Serbu et al.

OTHER PUBLICATIONS

Digital image of a Jain Irrigation Systems Ltd. irrigation clip.
Digital images of Netafim USA irrigation clip.
Digital images of Ore-Max irrigation clip.

* cited by examiner

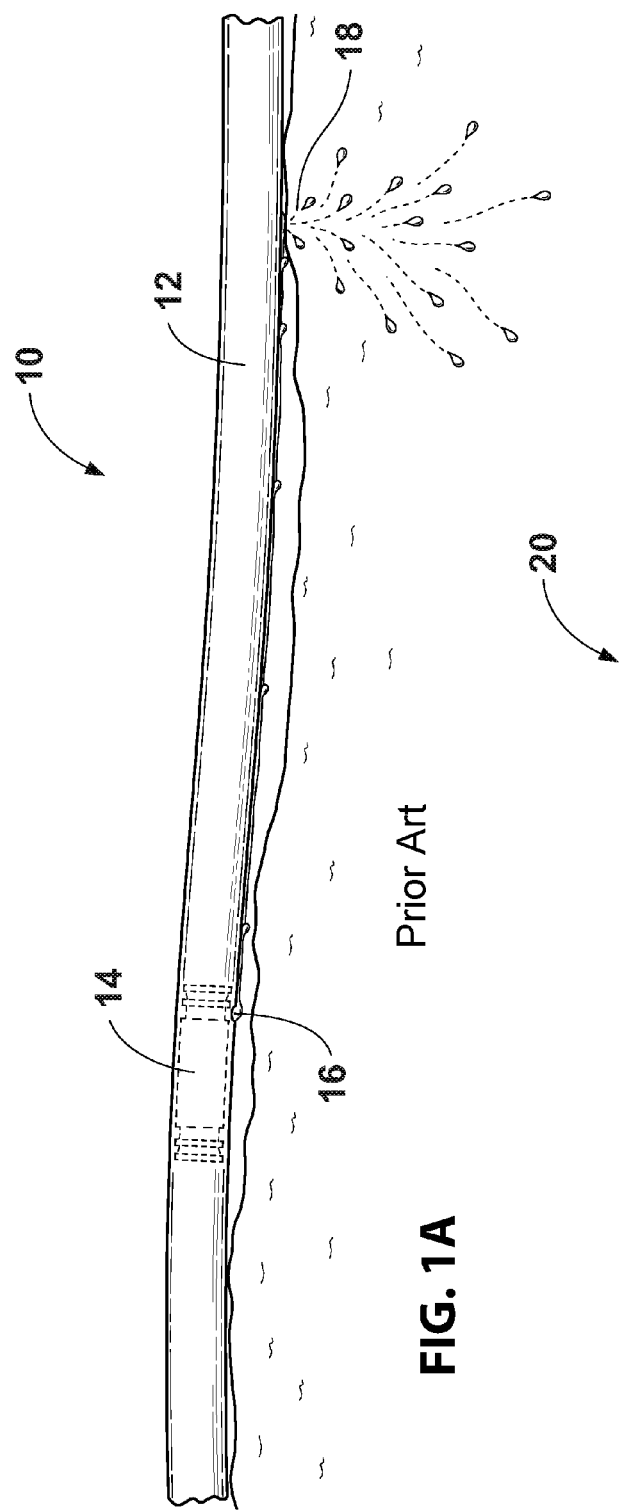
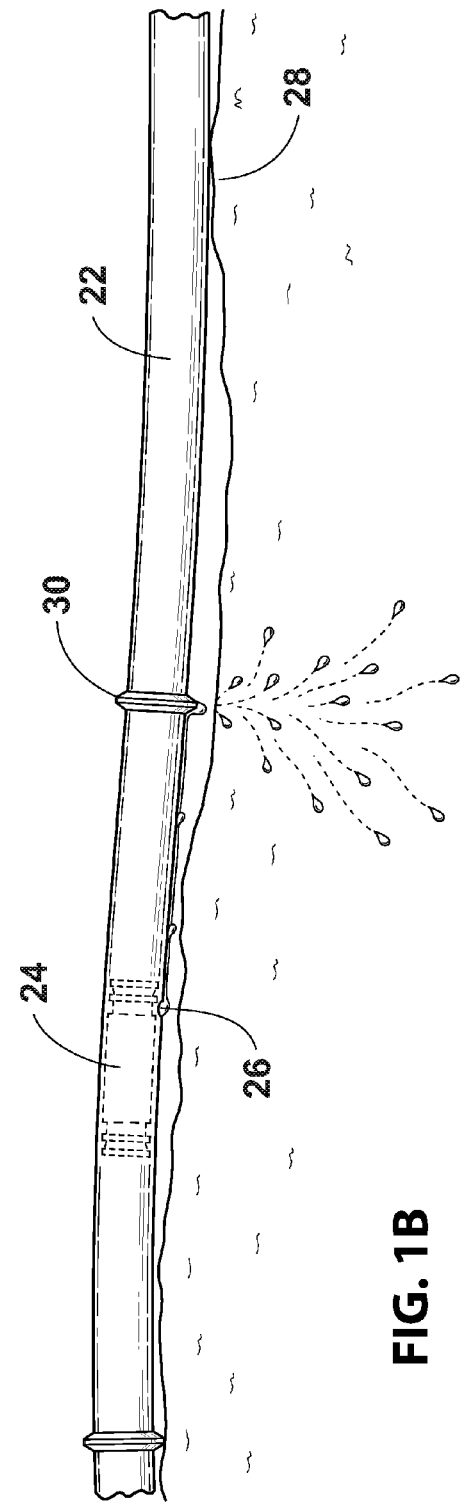
FIG. 1A Prior Art
FIG. 1B

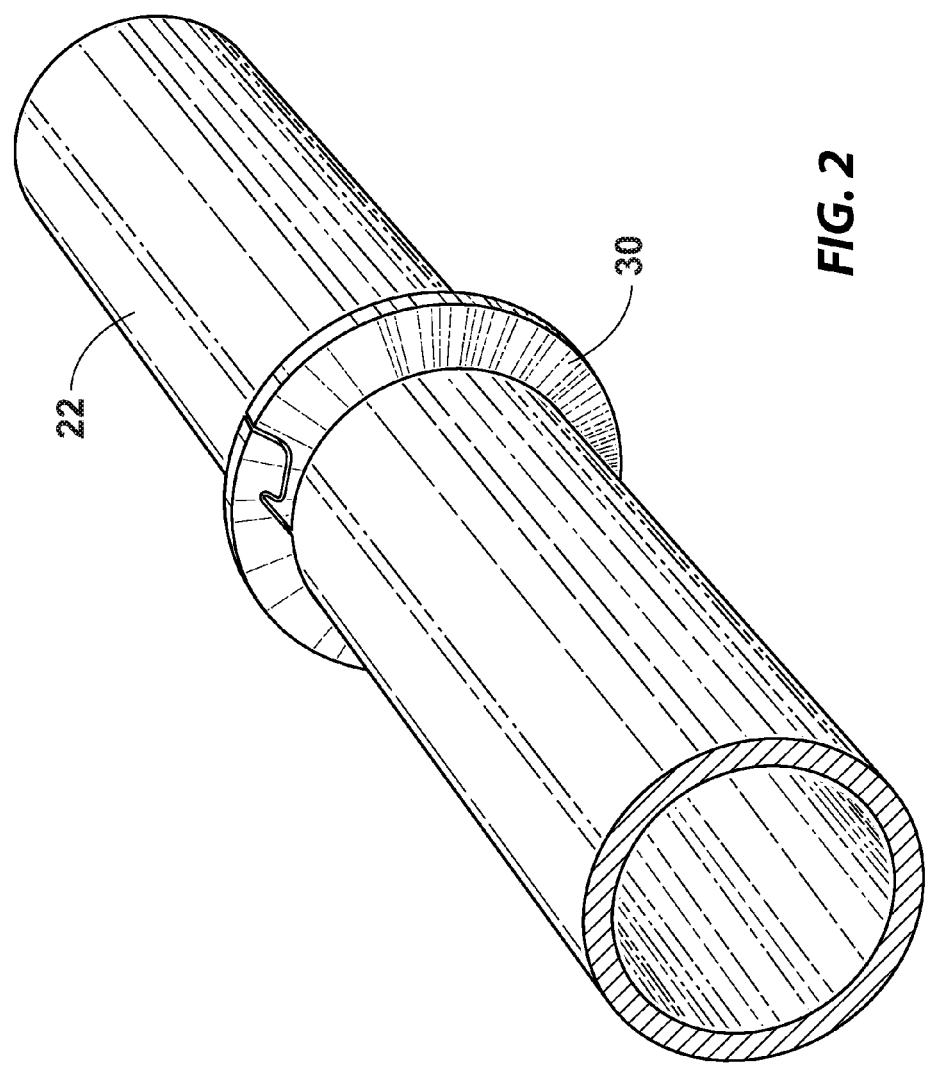

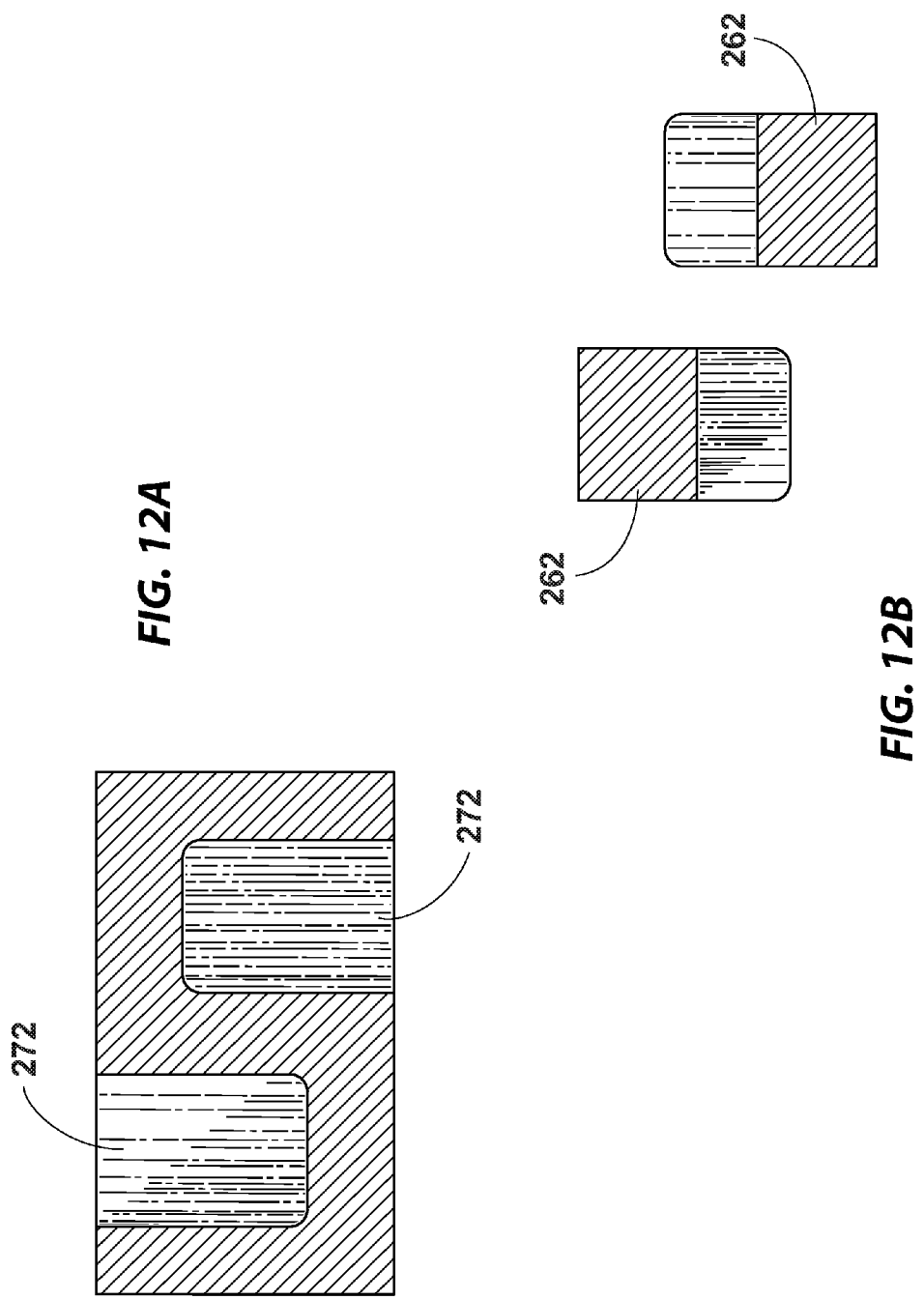

EMITTER TUBING CLIP

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

The present invention is usable in mining, agriculture, and landscape industries. Drip or flow-rate controlled leaching systems have various mining applications. Drip irrigation systems or flow-rate controlled irrigation systems have many uses in agriculture or landscape applications. In each setting, it is desirable to control the amount of fluid, such as chemistries used in heap leach treatments or water used in irrigation, that flows through a system over a given period of time. In this regard, various flow-rate control systems may be employed.

Flow-rate control systems typically include an emitter tube and inline emitters evenly spaced along the emitter tube. In the typical scenario, a portion of fluid flowing through an emitter tube in a flow-rate control system flows through an in-line emitter and exits the emitter tube through an orifice in the tube. Because inline emitters are evenly spaced along the emitter tube, the flow-rate control system is able to achieve controlled and even fluid distribution. Sometimes, however, the portion of fluid that exits the inline emitter continues traveling along the outside length of the emitter tube and drops off at a distant location where the emitter tube comes into contact with the ground or where it is at its lowest point, rather than proximate the inline emitter. Where there is uneven elevation of even a few degrees, fluid deposited from an inline emitter may run along the length of an emitter tube in the direction of low elevation, resulting in uneven fluid distribution, with concentrations in areas of low elevation.

Emitter clips that have been designed to solve the problem of uneven fluid distribution in flow-rate systems suffer from design features that render them ineffective and/or expensive to use and maintain. First, conventional clips are prone to fluid circumventing the clip and continuing along the length of the tube, particularly in wet or high humidity climates. Second, conventional clips often include splits that facilitate mounting to the emitter tube by prying each clip open at the split to fit over the tube. Because the clips remain open at the split after assembly and are not otherwise secured to the emitter tube, however, they are susceptible to dislodgement when the emitter tube is dragged or pulled onto a field or ore heap. The loss of even a small percentage of emitter clips in this manner increases maintenance costs and diminishes the overall effectiveness of the flow-rate control system.

SUMMARY

An embodiment of the claimed invention provides a device for assisting fluid distribution in a flow-rate control system to be placed on an emitter tube having spaced emitters therein. The device includes a ring having an inner surface disposed over the emitter tube and an engagement portion including first and second ends, wherein the first and second ends of the engagement portion engage one another to secure the ring to the emitter tube. The device may also include a second engagement portion having third and fourth ends, wherein the third and fourth ends of the second engagement portion engage one another to secure the ring to the emitter tube.

Another embodiment provides a flow-control system for distributing fluid over a distance. The system includes a linear emitter tube having a plurality of spaced orifices therein, a plurality of emitters positioned within the emitter tube adjacent the spaced orifices, and a plurality of spaced clips positioned on the emitter tube. Each clip includes a ring having an inner surface disposed over the emitter tube and an engagement portion including first and second ends that engage one another to secure the ring to the emitter tube, the engagement portion including at least two complementing hooking portions that engage each other.

Another embodiment provides a method for assisting fluid distribution in a flow-rate control system. The method includes the following steps: selecting a linear emitter tube having a plurality of spaced orifices therein; installing a plurality of emitters within the emitter tube adjacent the spaced orifices; and mounting, to the emitter tube, a plurality of rings, each ring having an inner surface and an engagement portion including first and second ends, and in which the inner surface of each ring is disposed over the emitter tube and the first and second ends of each engagement portion of each ring are engaged to secure each ring to the emitter tube.

Another embodiment of the method includes mounting a plurality of clips wherein each clip includes third and fourth ends and the third and fourth ends of each ring are engaged to secure each ring to the emitter tube

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and therefore are not to be considered limiting of its scope, the disclosure will be described with additional specificity and detail through use of the accompanying drawings, in which:

FIG. 1A is a partial schematic drawing of a prior art system, illustrating a flow-rate control system without emitter clips disposed thereon;

FIG. 1B is a partial schematic drawing illustrating a flow-rate control system with a plurality of emitter clips disposed thereon in accordance with a first embodiment;

FIG. 2 is a close-up perspective view of an emitter clip disposed on an emitter tube in accordance with the first embodiment;

FIG. 12A is a cross-sectional view of the emitter clip depicted in FIG. 9, at line 12A-12A;

FIG. 12B is a cross-sectional view of the emitter clip depicted in FIG. 9, at line 12B-12B;

DETAILED DESCRIPTION

Figure 3:
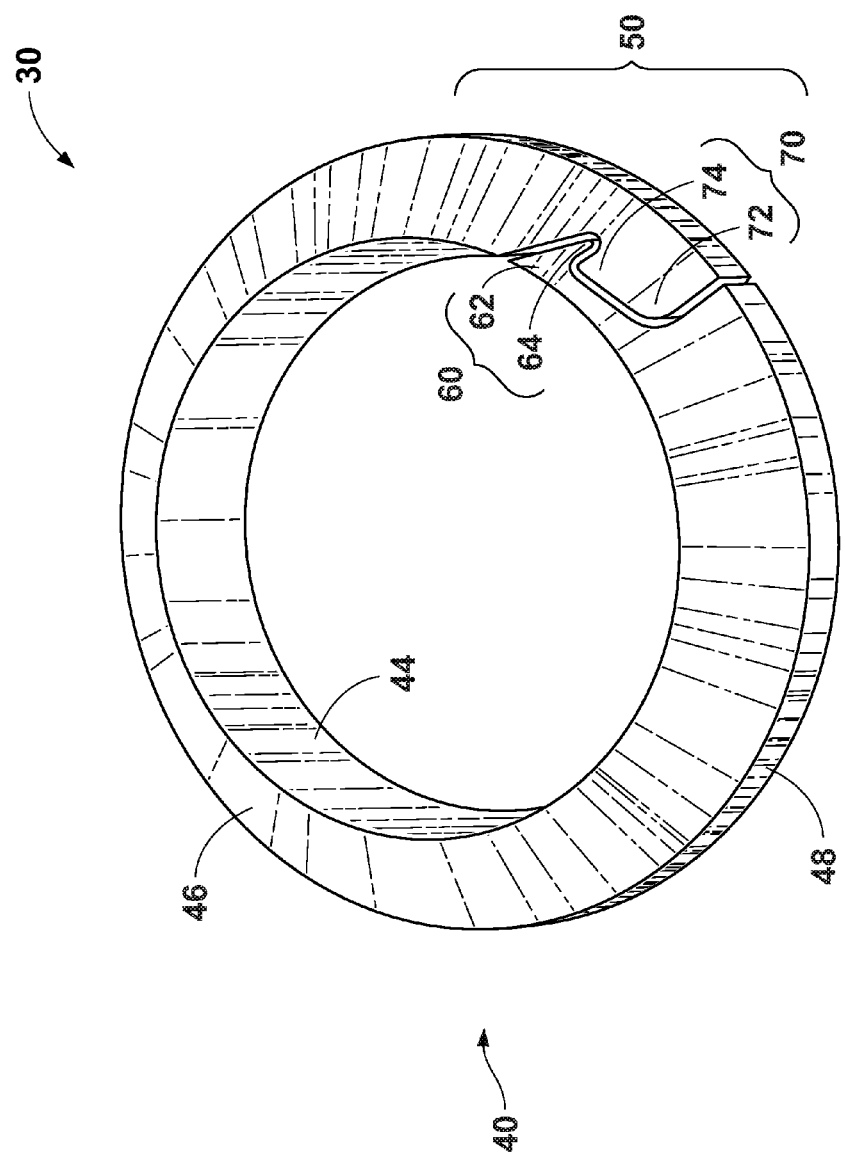
FIG. 3 is a perspective view of an emitter clip in accordance with the first embodiment.

Reference will now be made to the drawings wherein like numerals refer to like parts throughout. For ease of description, the components of embodiments of the present disclosure are described in the normal (upright) operating position, and terms such as upper, lower, horizontal, etc., are used with reference to this position. It will be understood, however, that the components of embodiments of the present disclosure may be manufactured, stored, transported, used, and sold in an orientation other than the position described.

Figures illustrating the components of embodiments of the present disclosure show some conventional mechanical elements that may be known and that may be recognized by one skilled in the art. The detailed descriptions of such elements are not necessary to an understanding of the disclosure and accordingly are herein presented only to the degree necessary to facilitate an understanding of the novel features of the present disclosure.

As used herein and in the appended claims, the term "comprising" is inclusive or open-ended and does not exclude additional unrecited elements, compositional components, or method steps. Accordingly, the term "comprising" encompasses the more restrictive terms "consisting essentially of" and "consisting of."

It must be noted that, as used in this specification and the appended claims, the singular forms "a," "an," and "the" include plural references unless the content clearly dictates otherwise. Similarly, the use of substantially any plural terms herein may be translated by those having skill in the art from the plural to the singular as is appropriate to the context and/or application. The various singular/plural permutations may be expressly set forth herein for the sake of clarity.

In those instances where a convention analogous to "at least one of A, B, and C, etc." is used, in general such a construction is intended in the sense that one having skill in the art would understand the convention (e.g., "an apparatus having at least one of A, B, and C" would include but not be limited to apparatuses that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

Unless defined otherwise, all technical and scientific terms used herein have the same meaning as commonly understood by one of ordinary skill in the art to which embodiments of the present invention pertain. Although a number of methods and materials similar or equivalent to those described herein can be used in the practice of the present invention, the preferred materials and methods are described herein.

FIG. 1A is a partial schematic drawing illustrating a portion of a simplified flow-rate control system 10 without emitter clips in accordance with the prior art. Positioned at the surface of a field or ore bed, system 10 includes a linear emitter tube 12, a plurality of emitters 14 positioned within the emitter tube, and orifices 16 on the surface of the emitter tube. Orifices 16 typically correspond with exit flow areas of emitters 14. As shown in FIG. 1A, fluid traveling through system 10 exits the emitter tube through orifice 16. Rather than depositing into the ground at or proximate orifice 16, the fluid travels along the length of emitter tube 12 and deposits into the ground at a low elevation point, such as position 18. This result circumvents an objective of flow-rate control systems like system 10, which is to evenly distribute fluid at or proximate the locations of orifices 16.

FIG. 1B is a partial schematic drawing illustrating a portion of a simplified flow-rate control system 20 in accordance with a first embodiment. While system 20 is positioned at the surface of a field or ore bed, it will be understood that a system according to the present embodiment may be positioned beneath or above the surface. System 20 includes a linear emitter tube 22, a plurality of emitters 24 positioned within the emitter tube, orifices 26 on the surface of the emitter tube that correspond with exit flow areas of the emitters, and one or more devices 30 for assisting fluid distribution in a flow-rate control system, which are spaced between each emitter. Such devices are commonly referred to as "emitter clips" and will be referred to as such herein. FIG. 2 depicts an enlarged perspective view of a section of emitter tube 22 with an emitter clip 30 disposed thereon in accordance with a first embodiment of the claimed invention. As shown in FIG. 1B, in contrast to prior art system 10 in FIG. 1A, fluid traveling through system 20 exits through orifice 26 and deposits into the ground at or proximate the location of emitter clip 30, rather than continuing along the emitter tube and depositing at a low elevation point, such as position 28. Accordingly, emitter clip 30 provides a solution to the problem of uneven fluid distribution in flow-rate control systems like system 20 where there is a drop in elevation.

Figure 4:
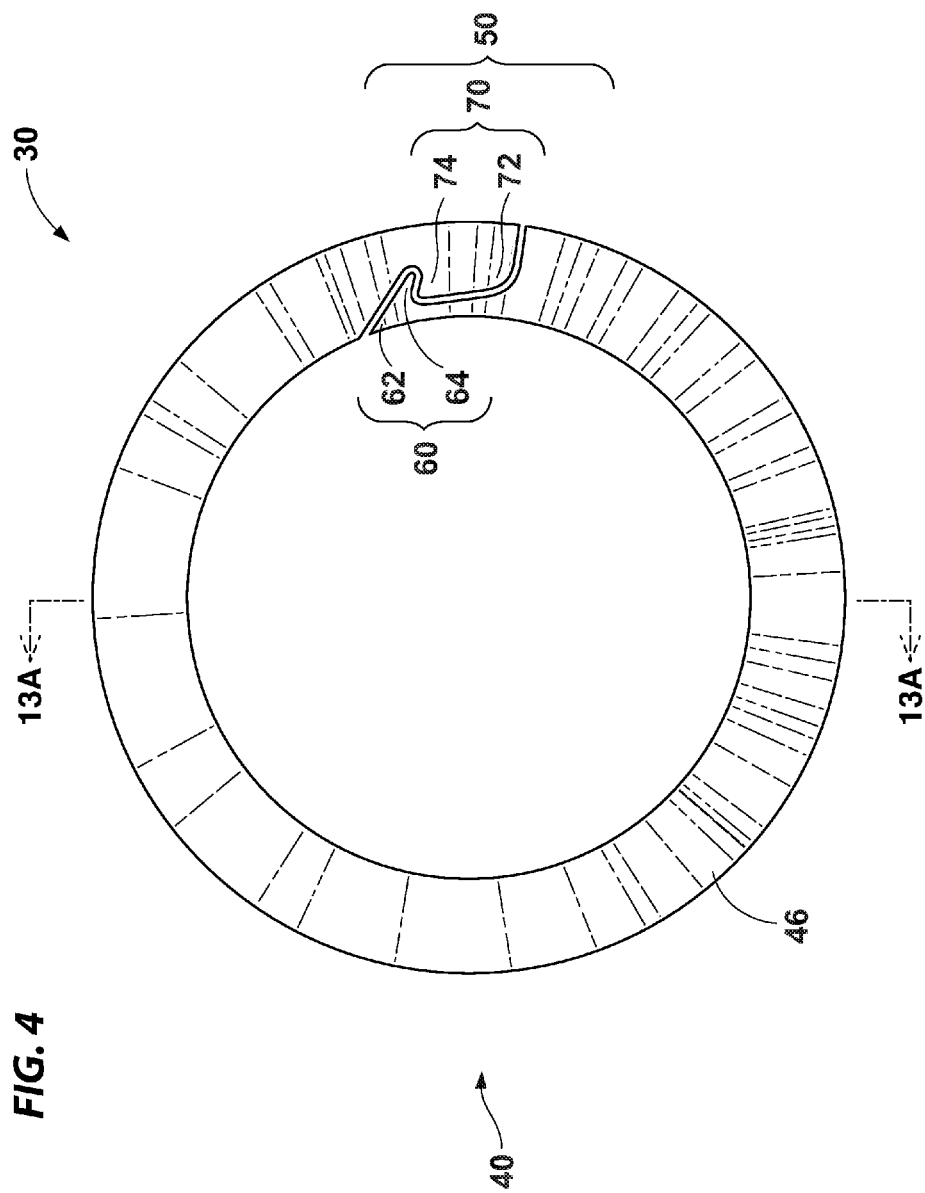
FIG. 4 is a top view of the emitter clip depicted in FIG. 3 in a closed position.
Figure 5:
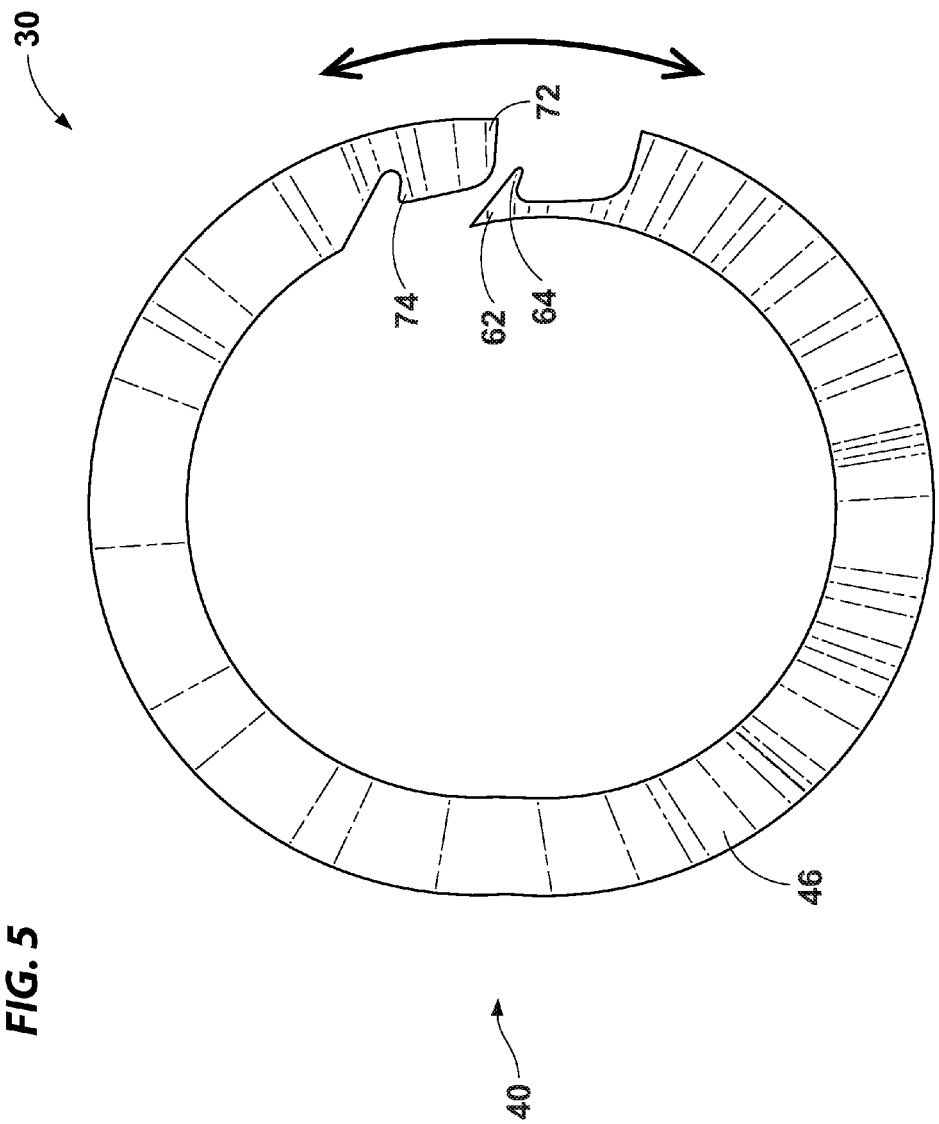
FIG. 5 is a top view of the emitter clip depicted in FIG. 3 in an open position.
Figure 13A:
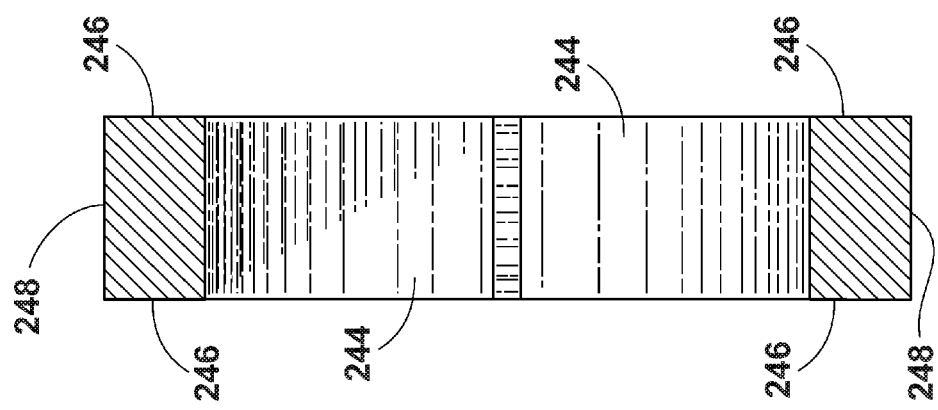
FIG. 13A is a cross-sectional view of the emitter clip depicted in FIG. 3, at line 13A-13A, as shown in FIG. 4.

FIGS. 2-5 and 13A depict the first embodiment of the present invention. FIG. 3 is an enlarged perspective view of emitter clip 30. FIG. 4 is a top view of the emitter clip 30 in a closed position. FIG. 5 is a top view of emitter clip 30 in an open position. FIG. 13A is a cross-sectional view of the emitter clip 30 taken along line 13A-13A of FIG. 4.

As shown in FIG. 3, emitter clip 30 includes a ring 40 and engagement portion 50. Ring 40 includes an inner surface 44 that is disposed over an emitter tube, an outer surface 48 that extends radially outwardly from the ring, and lateral walls 46 that extend from the inner surface and converge to the outer surface. Engagement portion 50 includes a first end 60 and a second end 70, which may be manipulated to open emitter clip 30, as shown in FIG. 5, or engaged to close emitter clip 30, as shown in FIGS. 3-4, or secure emitter clip 30 over an emitter tube, as shown in FIG. 2. First end 60 and second end 70 each includes a distal portion and proximal portion, distal portion 62 and proximal portion 64 and distal portion 72 and proximal portion 74, respectively. Those portions will sometimes herein be referring to as hooking portions.

To secure an open emitter clip 30 (as depicted in FIG. 5) to an emitter tube, first end 60 and second end 70 engage one another to close ring 40, as shown in FIGS. 3-4. More specifically, in this embodiment, proximal portions 64 and 74 of the first and second ends engage to close the ring. While the depicted embodiment shows a particular physical configuration and manner of engagement, it will be understood that first end 60 and second end 70 may take on various physical configurations.

To remove a closed emitter clip 30 (as depicted in FIGS. 3-4) from an emitter tube or prepare it for attachment to an emitter tube (as depicted in FIG. 2), first end 60 and second end 70, or more specifically, proximal portions 64 and 74, disengage to open ring 40, as shown in FIG. 5. To prevent ring 40 from snapping or breaking at or near the end diametrically opposed to engagement portion 50, emitter clip 30 may be fabricated of flexible material, for example, various plastics known to be used in the field, such that first end 60 and second end 70 of engagement portion 50 are adapted to being pulled apart to facilitate placement of the ring over an emitter tube and then forced toward each other to engage and thereby secure the ring to the emitter tube.

As shown in FIG. 3, ring 40 includes an inner surface 44, an outer surface 48, and lateral walls 46 that extend radially outwardly from the inner surface to the outer surface. As shown most clearly in FIG. 13A, a cross-sectional view of FIG. 4 along line 13A-13A, the thickness of inner surface 44 is typically greater than the thickness of outer surface 48. This difference in thickness encourages fluid to deposit into the ground upon reaching outer surface 48 of emitter clip 30, rather than bypassing outer surface 48 (and emitter clip 30 entirely) and continuing down the length of the emitter tube. While lateral walls 46 of the depicted embodiment are planar, it will be understood that an emitter clip according to the present invention may have lateral walls that are concave, convex, or otherwise curved. In addition, rather than converging to an outer surface with an appreciable thickness, lateral walls 46 may converge to an outer surface with minimal thickness, i.e., to a point.

Figure 6:
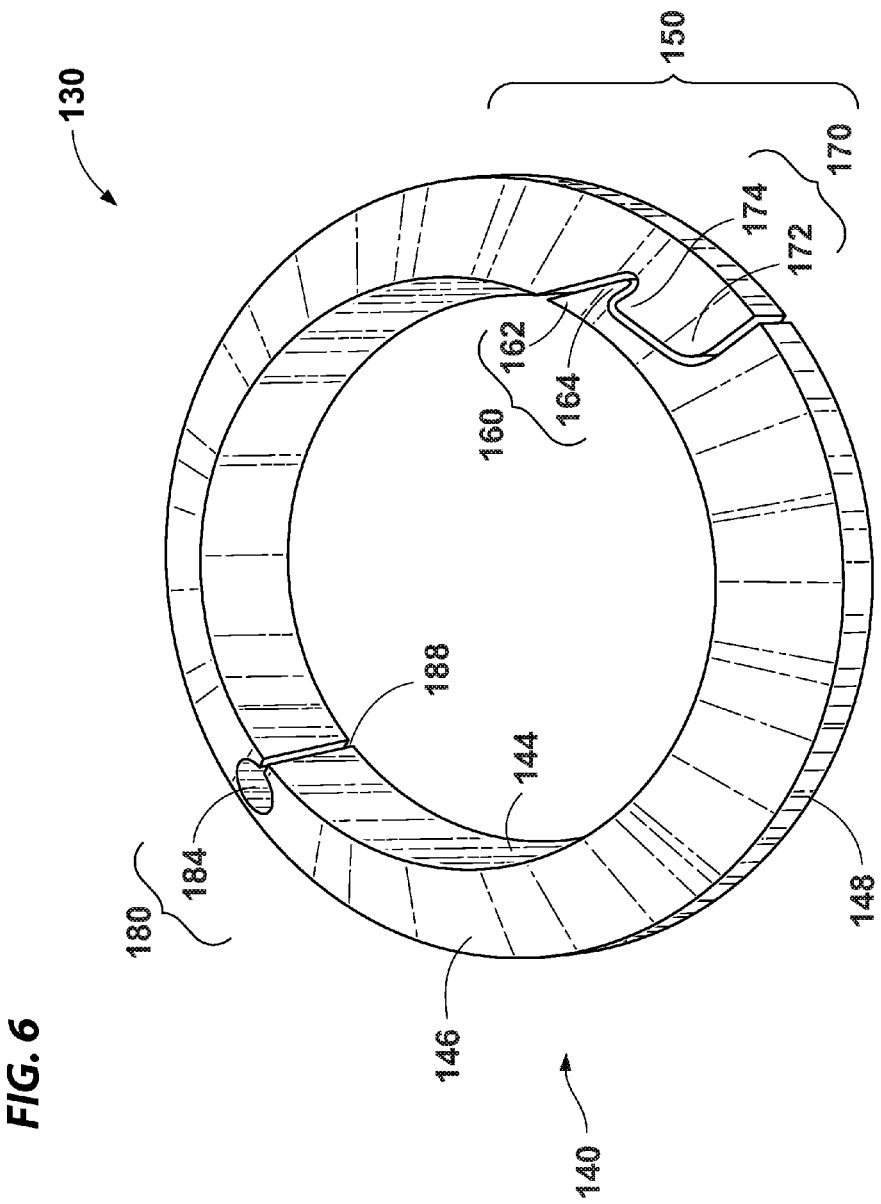
FIG. 6 is a perspective view of an emitter clip in accordance with a second embodiment of the invention.
Figure 7:
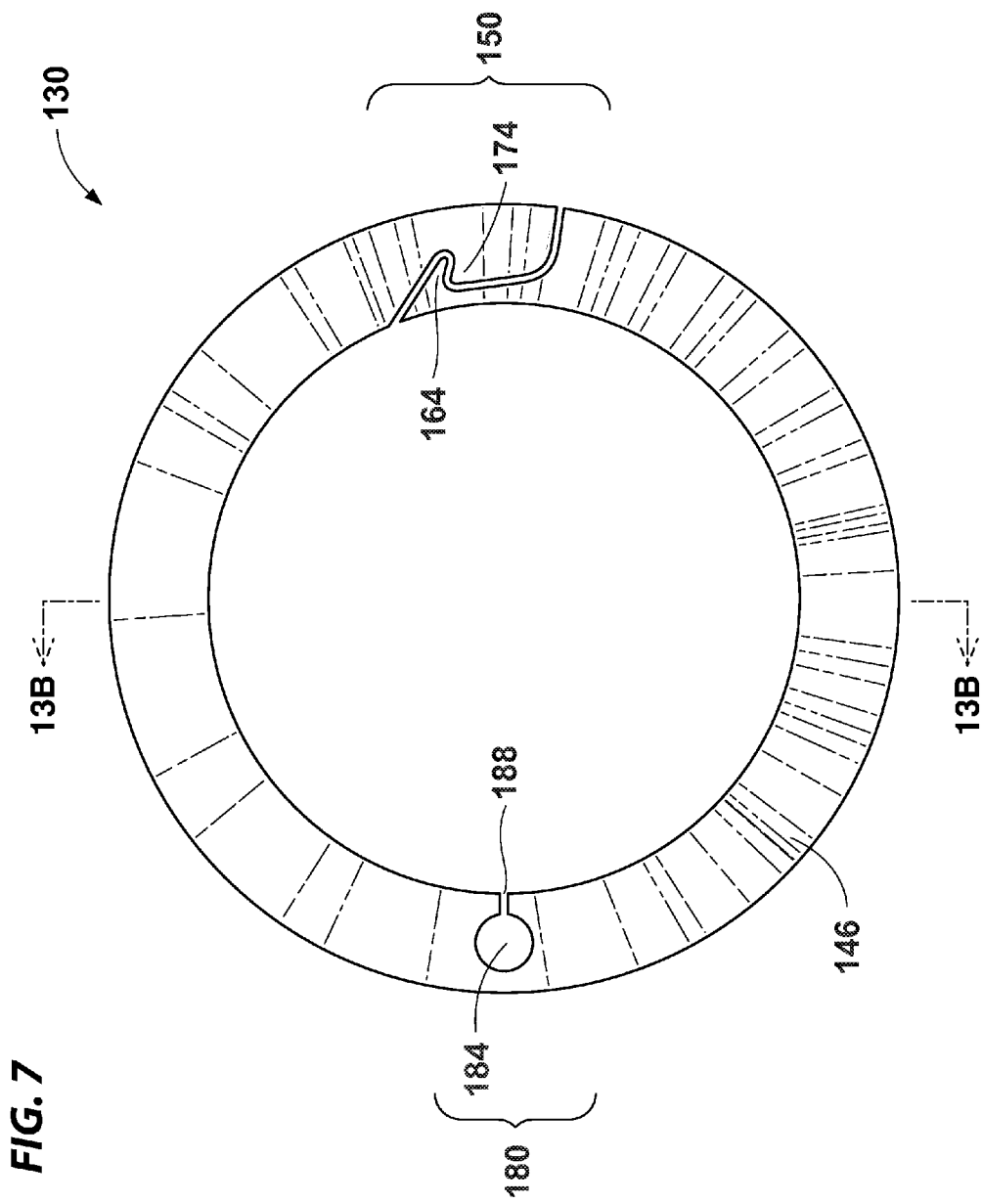
FIG. 7 is a top view of the emitter clip depicted in FIG. 6 in a closed position.
Figure 8:
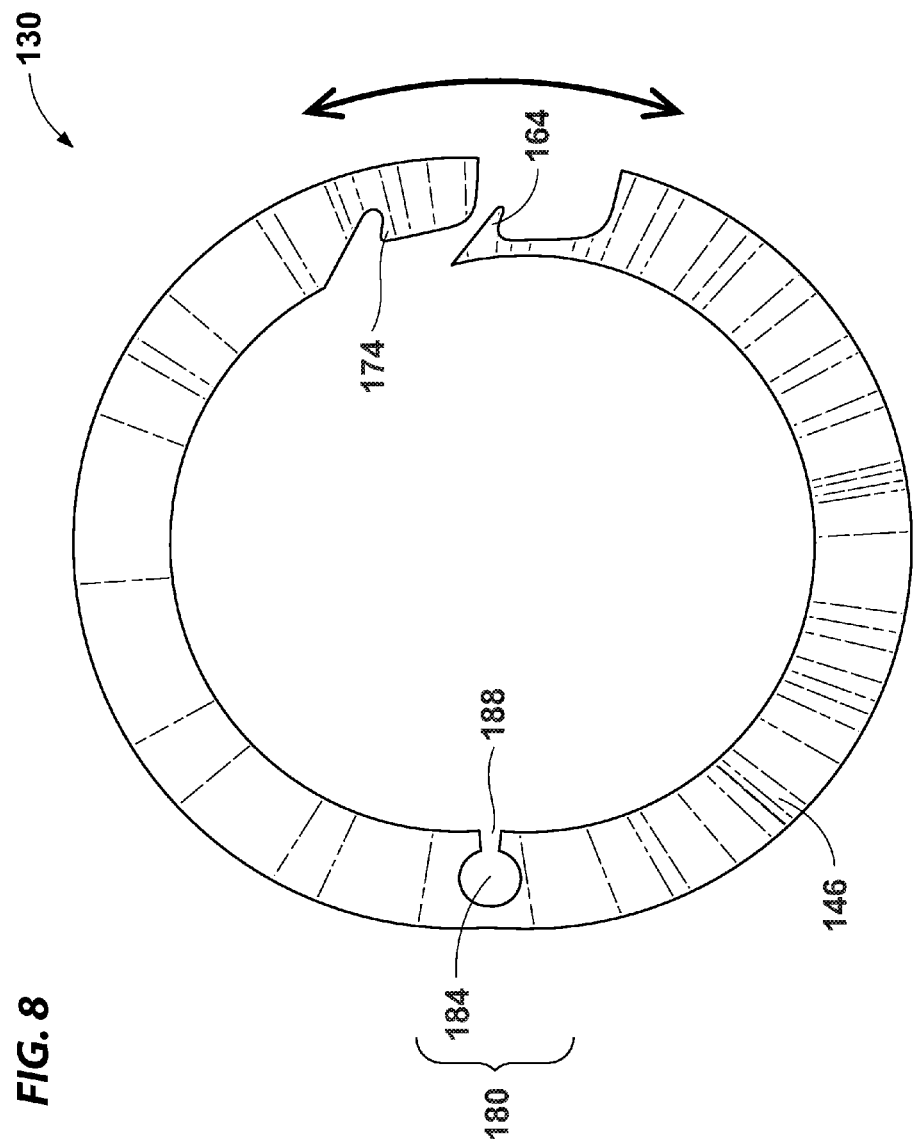
FIG. 8 is a top view of the emitter clip depicted in FIG. 6 in an open position.
Figure 13B:
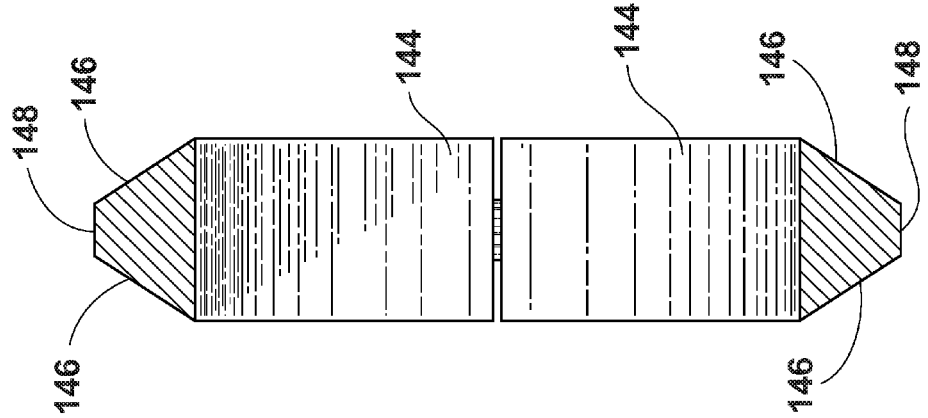
FIG. 13B is a cross-sectional view of the emitter clip depicted in FIG. 6, at line 13B-13B, as shown in FIG. 7.

FIGS. 6-8 and 13B depict a second embodiment of the present invention. FIG. 6 is an enlarged perspective view of an emitter clip 130. FIG. 7 is a top view of emitter clip 130 in a closed position. FIG. 8 is a top view of emitter clip 130 in an open position. FIG. 13B is a cross-sectional view of emitter clip 130 taken along line 13B-13B of FIG. 7.

As shown in FIG. 6, as in the first embodiment, emitter clip 130 includes a ring 140 and engagement portion 50; ring 140 includes an inner surface 144, outer surface 148, and lateral walls 146; and engagement portion 150 includes a first end 160 and a second end 170, which, in turn, include distal portions 162 and 172 and proximal portions 164 and 174, respectively. These elements of second embodiment emitter clip 130 appear and function substantially the same as first embodiment emitter clip 30.

Unlike the first embodiment, emitter clip 130 includes a flexible portion 180, in addition to ring 140 and engagement portion 150. Flexible portion 180 is spaced in diametric opposition to engagement portion 150 and includes an aperture 184 extending axially through the ring and a slit 188 extending radially inwardly toward inner surface 144. It will be understood that other embodiments contemplated by the claimed invention may position aperture 184 adjacent inner surface 144 and thereby omit slit 188. In this particular embodiment, however, aperture 184 and slit 188 provide emitter clip 130 the flexibility to open and close, as shown in FIGS. 7-8. It is contemplated that where flexible material to manufacture the first embodiment is not available, a manufacturer may incorporate features such as aperture 184 and slit 188 to provide the necessary flexibility for an emitter clip to open and close. However, even if flexible material is used, a manufacture may nonetheless choose to include features such as aperture 184 and slit 188 to provide additional assurance against breakage. While flexible portion 180 of the depicted embodiment includes the particular physical configuration of aperture 184 and slit 188 depicted, it will be understood that the present invention contemplates variations of aperture 184 and slit 188, including variations of different shapes and sizes.

Figure 9:
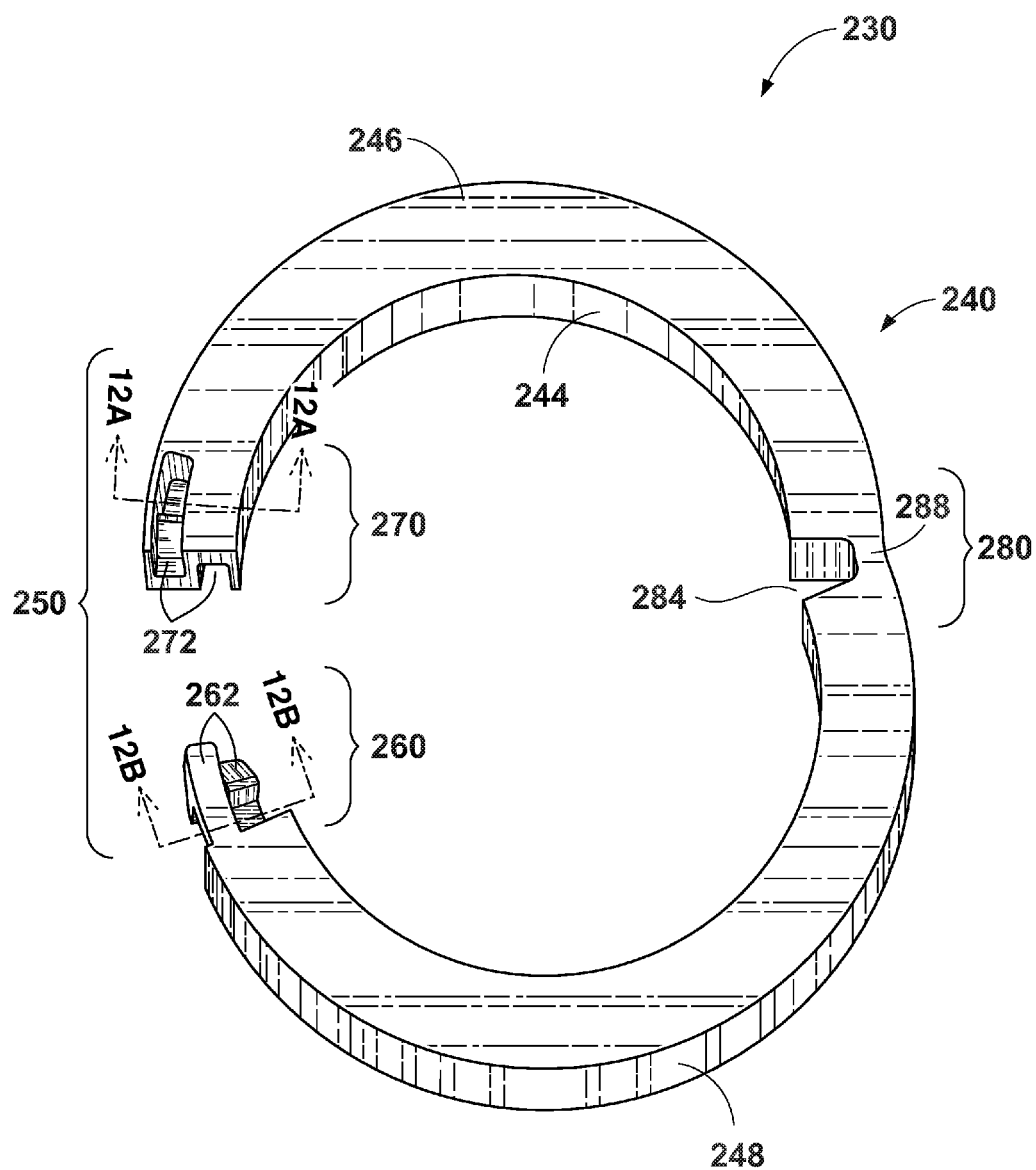
FIG. 9 is a perspective view of an emitter clip in accordance with a third embodiment of the invention.
Figure 10:
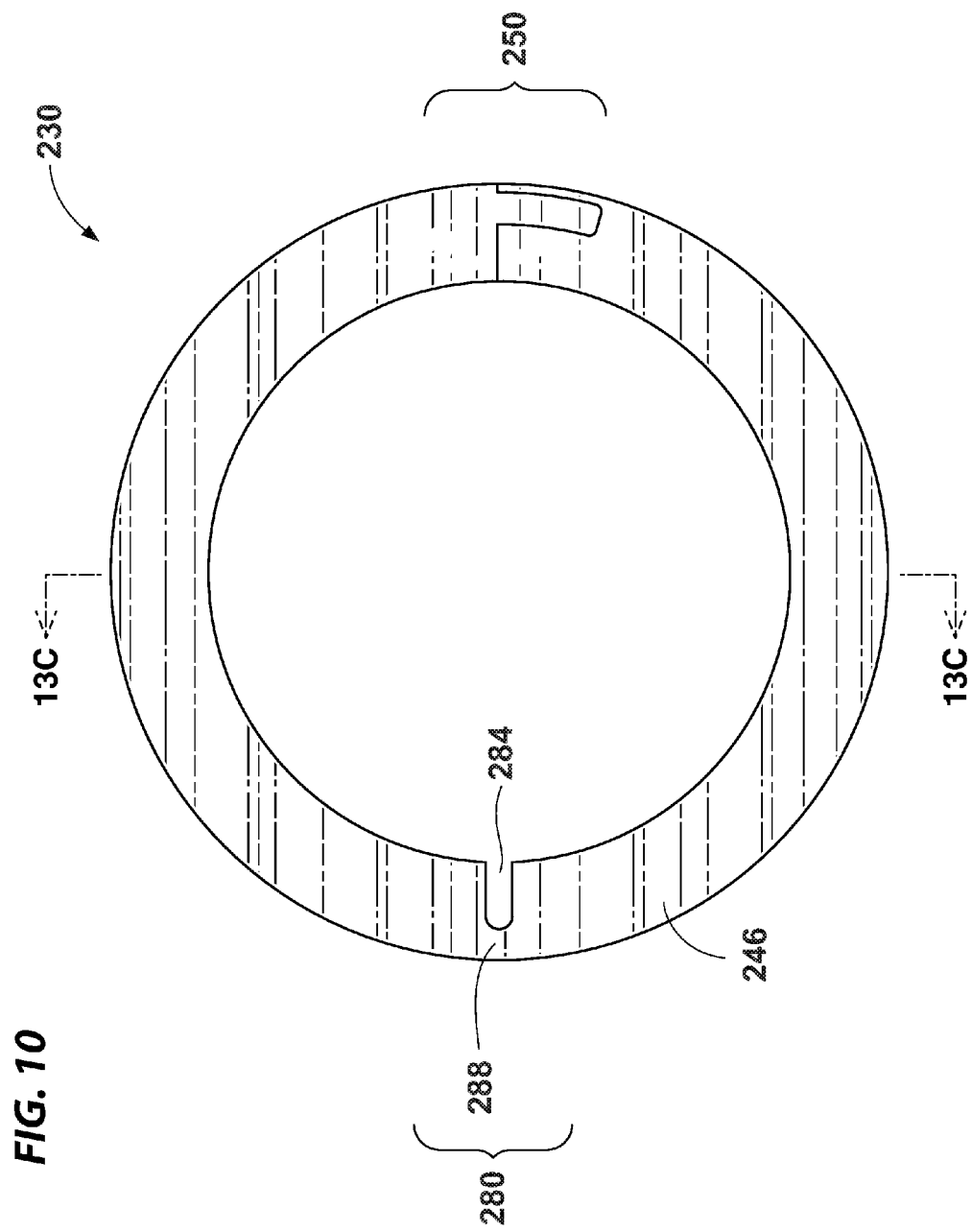
FIG. 10 is a top view of the emitter clip depicted in FIG. 9 in a closed position.
Figure 11:
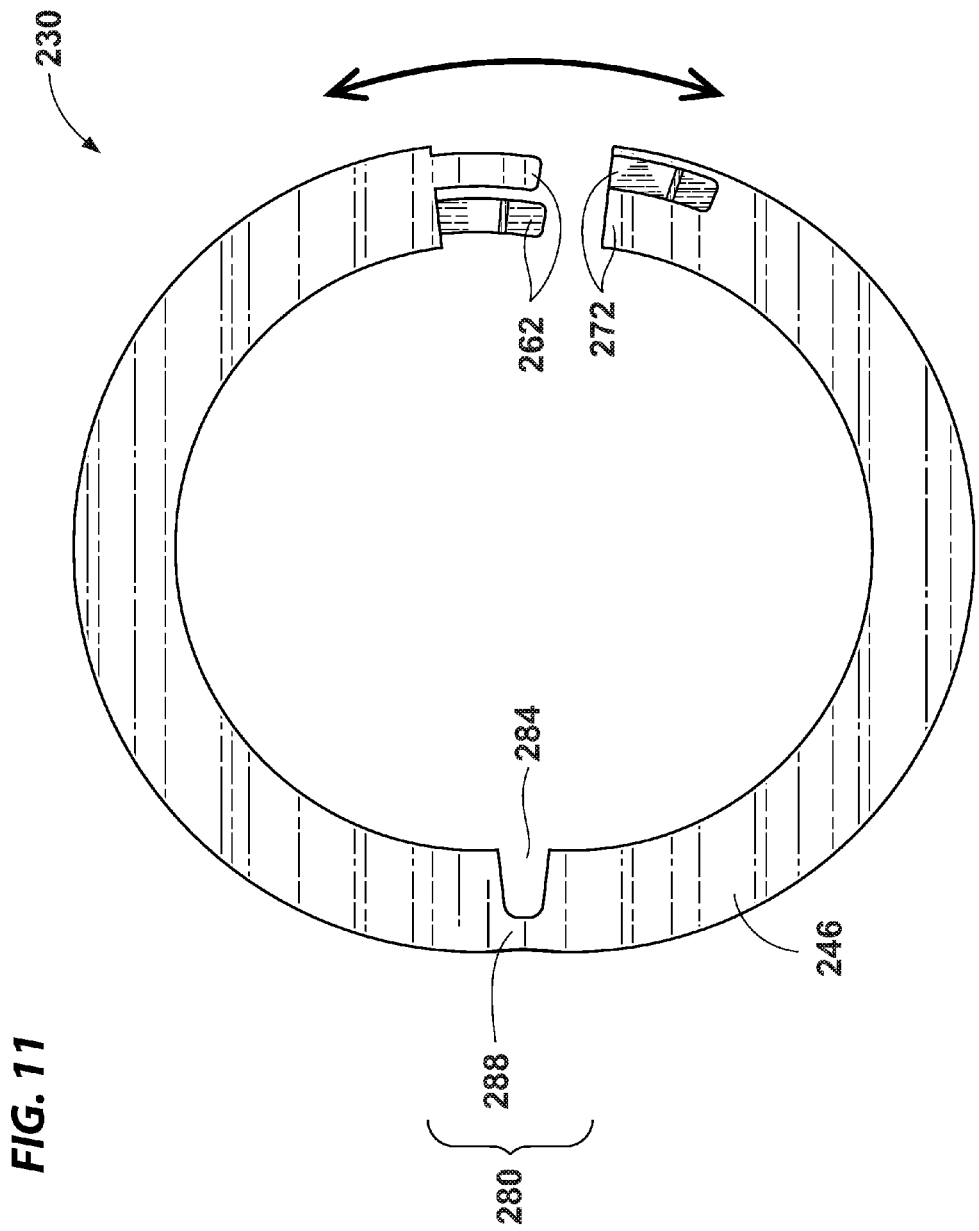
FIG. 11 is a top view of the emitter clip depicted in FIG. 9 in an open position.
Figure 12C:
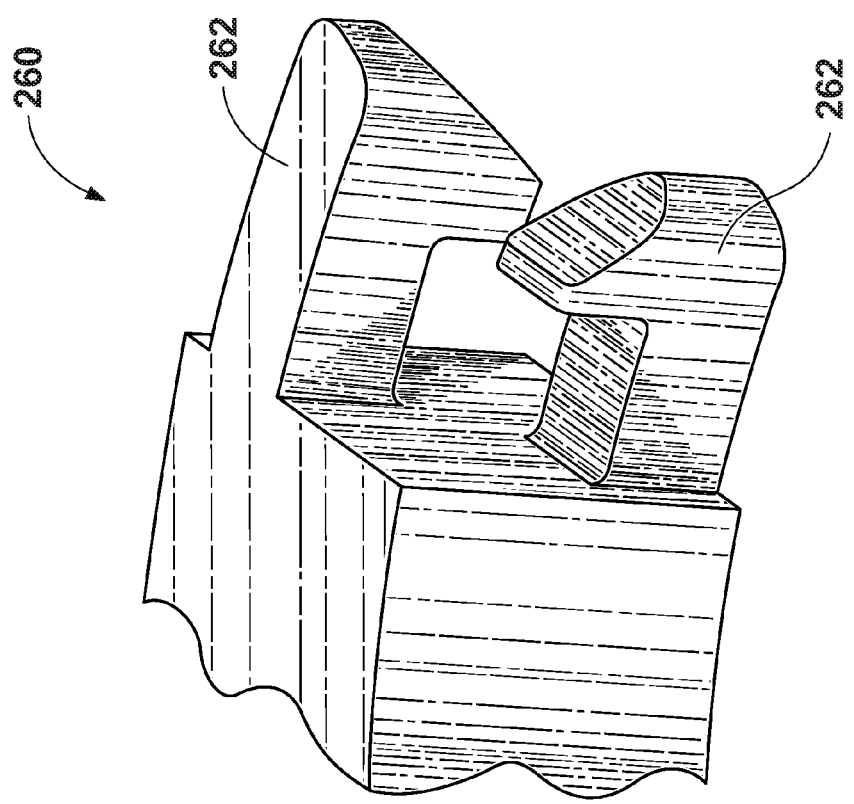
FIG. 12C is a perspective view of the protruding members of the emitter clip depicted in FIG. 9.
Figure 13C:
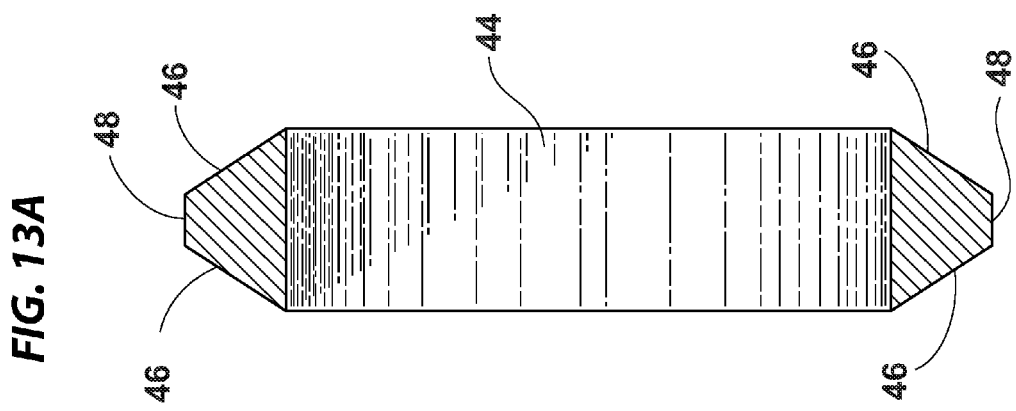
FIG. 13C is a cross-sectional view of the emitter clip depicted in FIG. 9, at line 13C-13C, as shown in FIG. 10.

FIGS. 9-12 and 13C depict a third embodiment of the present invention. FIG. 9 is an enlarged perspective view of an emitter clip. FIG. 10 is a top view of the emitter clip in a closed position. FIG. 11 is a top view of the emitter clip in an open position. FIGS. 12A and 12B are cross-sectional views of the emitter clip taken along lines 12A-12A and 12B-12B of FIG. 9, respectively. FIG. 12C is an expanded perspective view of protruding members of the emitter clip. FIG. 13C is a cross-sectional view of the emitter clip taken along line 13C-13C of FIG. 10.

As shown in FIG. 9, similar to the first and second embodiments, emitter clip 230 includes a ring 240 comprised of an inner surface 244, outer surface 248, and lateral walls 246. Ring 240 of third embodiment emitter clip 230 appears and functions substantially the same as first and second embodiment emitter clips 30 and 130, except that lateral walls 246 are substantially perpendicular to the inner and outer surfaces, and the thickness of the inner and outer surfaces are substantially the same, as most clearly shown in FIG. 13C. However, it will be understood that an emitter clip according to the present embodiment may have lateral walls that converge at the outer surface and outer surfaces whose thickness is less than that of the inner surfaces, as depicted in the first and second embodiments.

Like the first and second embodiments, engagement portion 250 of emitter clip 230 includes a first end 260 and a second end 270 that may be engaged to open and close emitter clip 230, as shown in FIGS. 10-11. However, unlike the first embodiment 30, emitter clip 230 includes a hinge portion 280 and a plurality of protruding and receiving members. First end 260 includes a plurality of protruding members 262 and second end 270 includes a plurality of receiving members 272. FIGS. 12A and 12B depict cross-sectional views of receiving members 272 and protruding members 262 along lines 12A-12A and 12B-12B of FIG. 9, respectively. A close-up view of protruding members 262 is provided in FIG. 12C. Typically, there is a corresponding number of protruding members 262 and receiving members 272. In other embodiments (not depicted here), first and second ends may include a mix of protruding members and receiving members. Like the first embodiment, these four protruding and receiving members will sometimes herein be referred to as hooking portions.

While the depicted embodiment shows engagement portion 250 having a particular physical configuration, it will be understood that first and second ends 260 and 270, respectively, may take on various physical configurations. The advantage of having a plurality of protruding members and receiving members according to the present embodiment is that should one or more protruding members of an emitter clip break or become damaged, the remaining protruding members continue to function, and as a result, and the emitter clip stays secured on the emitter tube.

Hinge portion 280 includes a slot 284 extending radially inwardly toward the inner surface 244 and a connection portion 288 spaced between slot 284 and outer surface 248. Slot 284 and connection portion 288 allow emitter clip 230 the flexibility to open and close, as shown in FIGS. 10-11. It is contemplated that where manufacture of the first embodiment is not possible due to cost or lack of flexible material, a manufacturer may incorporate features such as aperture 184 and slit 188 of second embodiment 130 or slot 284 and connection portion 288 of third embodiment 230 to provide the necessary flexibility for the emitter clip to open and close. Even if flexible material is used, a manufacture may nonetheless choose to include one or more of these features to provide additional assurance against breakage. While hinge portion 280 of the depicted embodiment includes a particular physical configuration of slot 284 and connection portion 288, it will be understood that the present invention contemplates variations of slot 284 and connection portion 288, including those of different shapes and sizes.

Figure 14:
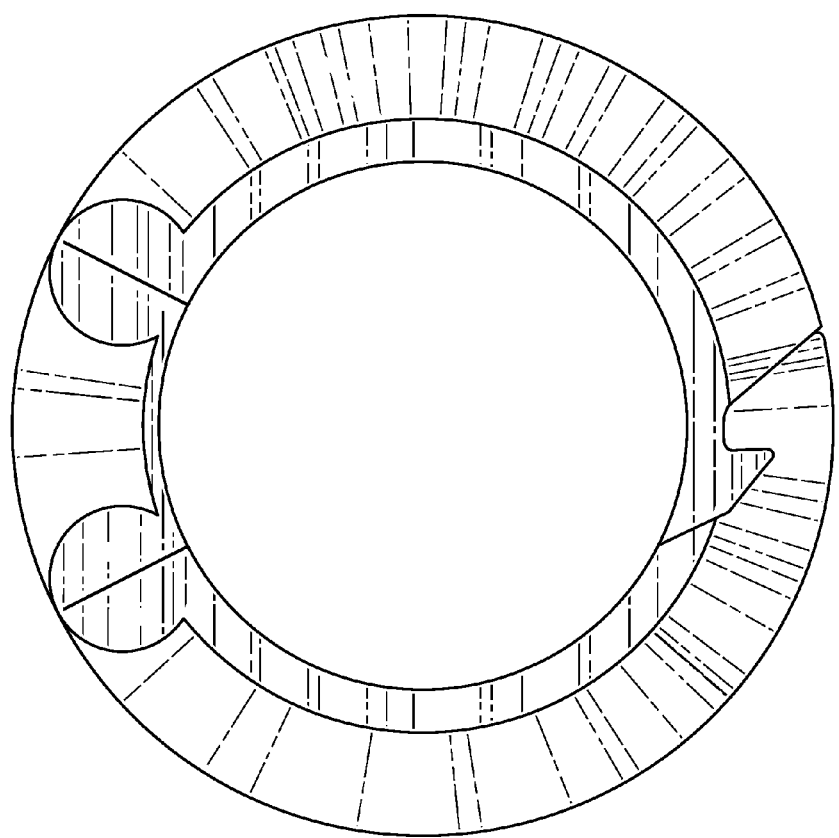
FIG. 14 is a top view of an emitter clip in accordance with a fourth embodiment of the invention.
Figure 15:
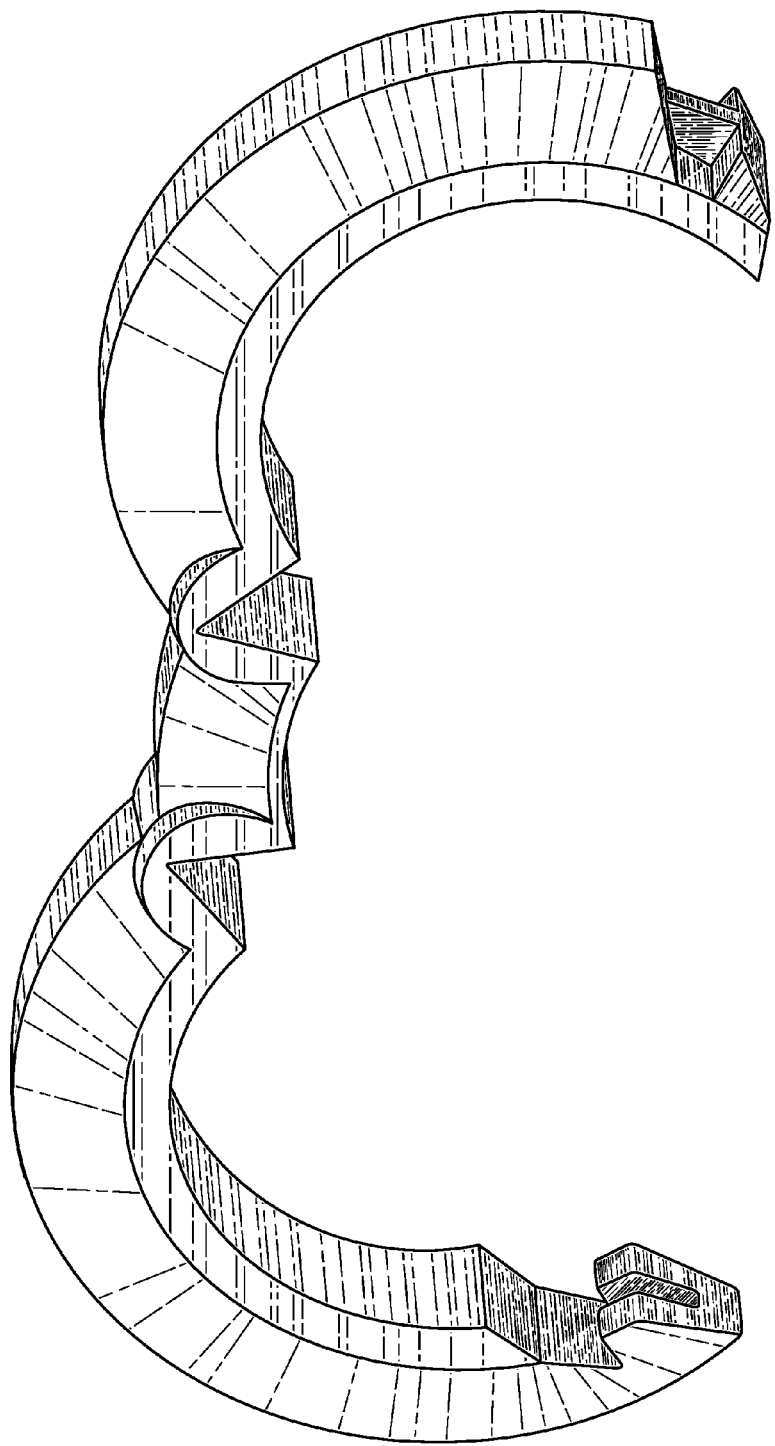
FIG. 15 is a top view of the emitter clip depicted in FIG. 14 in an open position.
Figure 16:
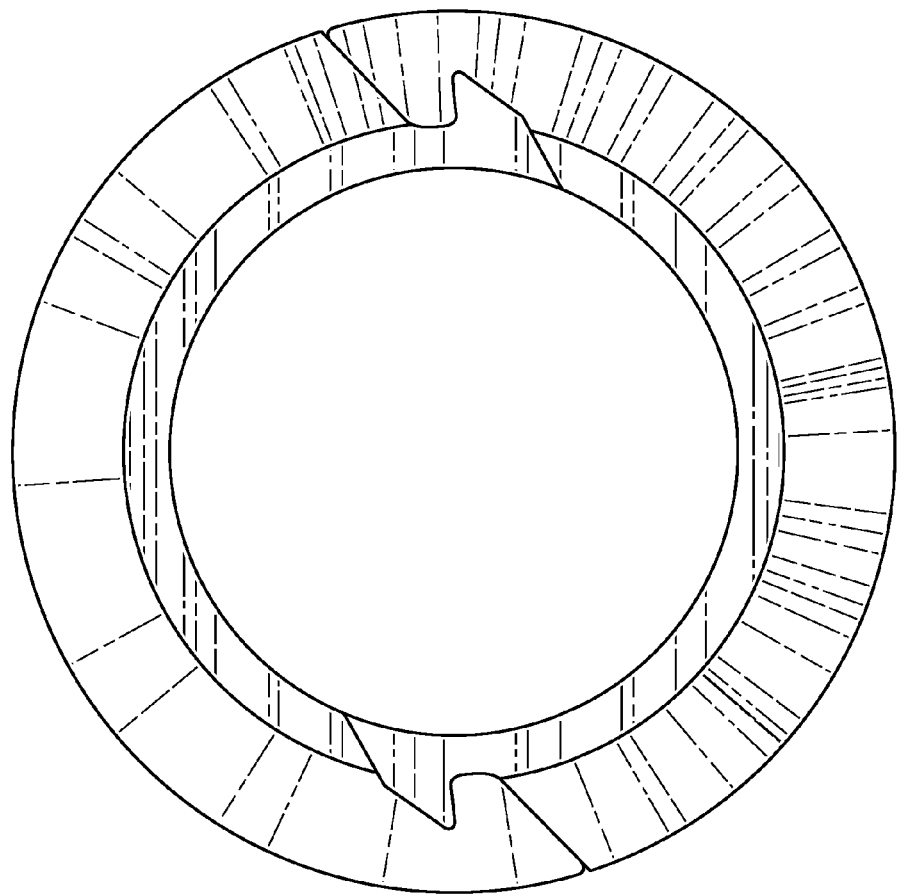
FIG. 16 is a top view of an emitter clip in accordance with a fifth embodiment of the invention.
Figure 17:
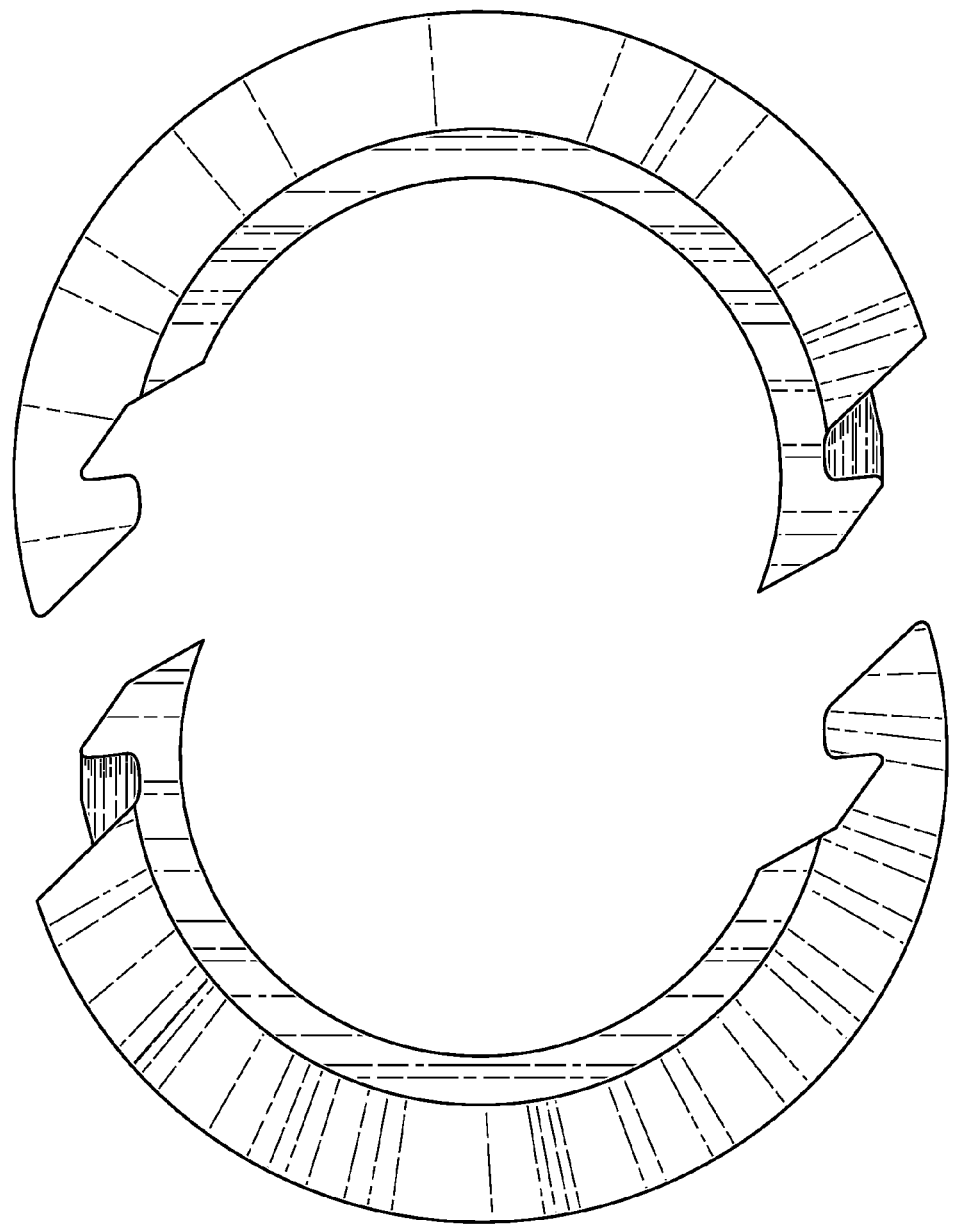
FIG. 17 is a top view of the emitter clip depicted in FIG. 16 in an open position.

FIGS. 14 and 15 depict a fourth embodiment of the present invention 330. Similar to the first and second embodiments, emitter clip 330 includes a ring 340 comprised of an inner surface 344, outer surface 348, and lateral walls 346. Ring 340 of fourth embodiment emitter clip 330 appears and functions substantially the same as first and second embodiment emitter clips 30 and 130. Like those emitter clips, lateral walls 346 may converge such that the outer surface 348 has a thickness that is less than that of the inner surface 344, as shown in FIGS. 13A and B depicting the first and second embodiments.

Like the first and second embodiments, engagement portion 350 of emitter clip 330 includes a first end 360 and a second end 370 that may be engaged to open and close emitter clip 330, as shown in FIGS. 14 and 15, or to secure emitter clip 330 over an emitter tube, as shown in FIG. 2 with respect to the first embodiment 30. First end 360 and second end 370 include a distal portion 362, a proximal portion 364, a distal portion 372 and a proximal portion 374, respectively. As with the prior embodiments, those portions may sometimes herein be referring to as hooking portions.

However, unlike the first embodiment 30, and like the second and third embodiments 130 and 230, emitter clip 330 includes a hinge 380. Unlike hinge portions 180 and 280, the hinge of emitter clip 330 includes two hinge portions 380a and 380b. Thus, hinge 380 of emitter clip 330 is compound in that it includes two slits 384a and 384b and two connecting portions 388a and 388b. In certain applications this might be preferable than the embodiments having a single hinge portion.

As shown in FIG. 15, the depicted emitter clip 330 includes in its engagement portion 350 a circumferentially extending groove 376 and complementing rib 378 that engage each other when emitter clip 330 is closed over an emitter tube. This configuration may tend to limit twisting or relative axial movement of the joining portions, and thereby reduce the likelihood of accidental dislodging of emitter clip 330.

Figure 18A:
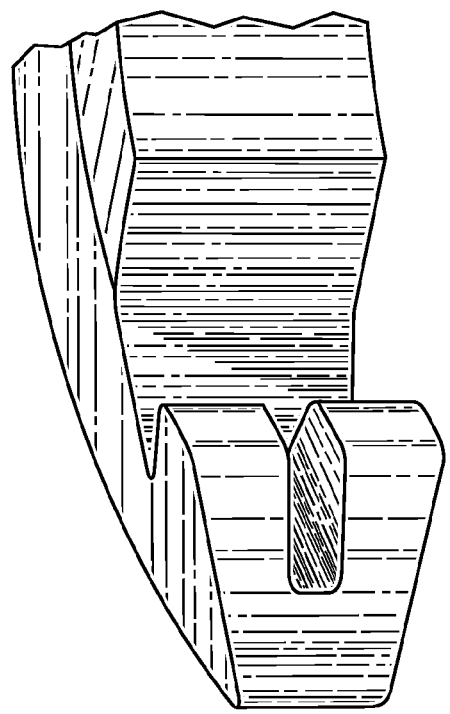
FIG. 18A is a perspective view of one of the protruding members of the emitter clip depicted in FIG. 16.

FIGS. 16, 17, 18A and 18B depict a fifth embodiment of the present invention. Similar to the other embodiments, emitter clip 430 includes a ring 440 comprised of an inner surface 444, outer surface 448, and lateral walls 446. Ring 440 of fifth embodiment emitter clip 430 appears and functions substantially the same as the other embodiments but instead of flexing like emitter clip 30, or having hinged portions like emitter clips 130, 230 and 330, emitter clip 430 is formed of two halves 440a and 440b. Like those emitter clips, lateral walls 446 may converge such that the outer surface 448 has a thickness that is less than that of the inner surface 444, as shown in FIG. 18A.

Because it includes two halves, emitter clip 430 includes two engagement portions 450a and 450b. Each engagement portion includes a first end 460a or 460b and a second end 470a or 470b that may be engaged to open and close emitter clip 430 over an emitter tube, as shown in FIG. 2 with respect to the first embodiment 30. First ends 460a and 460b and second ends 470a and 470b each include a distal portion 462a or 462b and a proximal portion 464a or 464b. As with the prior embodiments, those portions may sometimes herein be referring to as hooking portions.

Figure 18B:
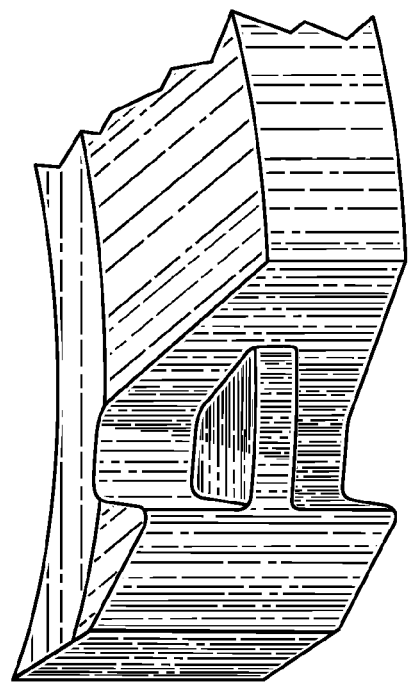
FIG. 18B is a perspective view of one of the receiving members of the emitter clip depicted in FIG. 16.

FIGS. 18A and 18B show that, much like embodiment 330, each of the engagement portions 450a and 450b may include a circumferentially extending groove 476a or 476b and complementing rib 478a or 478b that engage each other when emitter clip 430 is closed over an emitter tube. As with emitter clip 330, this configuration may tend to limit twisting or relative axial movement of the joining portions, and thereby reduce the likelihood of accidental dislodging of emitter clip 430.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A flow-rate control system for distributing fluid over a distance, comprising:
a linear emitter tube having a plurality of spaced orifices therein;
a plurality of emitters positioned in fluid communication with the emitter tube and the spaced orifices; and
a plurality of spaced clips adjustably and removably positioned on the emitter tube, wherein each clip comprises a ring having an inner surface disposed over the emitter tube and in close, continuous contact with the emitter tube for its entire circumference other than at least one or more engagement portions, each of which includes first and second ends that engage one another to secure the ring to the emitter tube, each of the engagement portions including at least two complementing hooking portions that engage each other, so that fluid that passes out of the orifices and runs along the length of the emitter tub will be disrupted by the spaced clips.

2. The flow-rate control system of claim 1, wherein the one or more engagement portions includes at least four complementing hooking portions that engage each other.

3. The flow-rate control system of claim 1, wherein there are more than one engagement portions, at least one of the engagement portions having third and fourth ends, and wherein the third and fourth ends of the at least one of the engagement portions engage one another to secure the ring to the emitter tube.

4. A flow-rate control system for distributing fluid over a distance, comprising:
   a linear emitter tube having a plurality of spaced orifices therein;
   a plurality of emitters positioned within the emitter tube in fluid communication with the spaced orifices; and
   a plurality of spaced clips adjustably and removably positioned on the emitter tube, wherein each clip comprises a ring having an inner surface disposed over the emitter tube in fluid-tight contact for its entire circumference that prevents fluid from passing between the ring and the emitter tube, the ring further including a first engagement portion that includes at least first and second complementing hooking portions that engage each other to adjustably and removably mount the clips to the emitter tube.

5. The system of claim 4 wherein the first and second hooking portions each includes a proximal portion and distal portion and wherein the proximal portion of one of the first and second hooking portions engages the proximal portion of the other of the first and second hooking portions to secure the ring to the emitter tube.

6. The system of claim 4 wherein the ring has at least one flexible portion spaced in opposition to the first engagement portion, the at least one flexible portion facilitating opening and closing the ring at the engagement portion.

7. The system of claim 6 wherein the at least one flexible portion includes a slot and a connection portion, the slot extending radially inwardly to the inner surface and the connection portion extending radially outwardly from the slot.

8. The system of claim 7 wherein the ring has an open and a closed position, and in the open position the slot and the engagement portion are open, and in the closed position the slot is closed and the engagement portion is engaged.

9. The system of claim 4, further comprising a second engagement portion having third and fourth ends, wherein the third and fourth ends of the second engagement portion engage one another to secure the ring to the emitter tube.

10. The system of claim 9, wherein the third and fourth ends of the second engagement portion each includes a proximal portion and distal portion and wherein the proximal portion of one of the third and fourth ends engages the proximal portion of the other of the third and fourth ends to secure the ring to the emitter tube.

11. The system of claim 4 wherein the ring also has an outer surface disposed radially outwardly of the inner surface and wherein the ring has a substantial width dimension that is greater at the inner surface than at the outer surface.

\* \* \* \* \*